United States Patent
Brewis (10) Patent No.: US 6,499,511 B2
(45) Date of Patent: Dec. 31, 2002

(54) PIPE END FITTINGS (76) Inventor: Roderick Charles Brewis, Brewis Engineering Hendelmaker Road, Marston Trading Estate, Frome, Somerset, BA11 4RW (GB)

( * ) Notice: Subject to any disclaimer, the term of this patent is extended or adjusted under 35 U.S.C. 154(b) by 0 days.

(21) Appl. No.: 10/000,351

(22) Filed: Dec. 4, 2001

(65) Prior Publication Data

US 2002/0066490 A1 Jun. 6, 2002

(30) Foreign Application Priority Data

Dec. 4, 2000 (GB) .............................. 0029536

(51) Int. Cl.⁷ ................................................ F16L 55/10
(52) U.S. Cl. .......................... 138/89; 138/90; 138/96 R
(58) Field of Search ........................... 138/89, 90, 96 R (56) References Cited

U.S. PATENT DOCUMENTS

| | | | | |
|---|---|---|---|---|
| 3,860,037 A | * | 1/1975 | Rowe ........................... | 138/89 |
| 4,175,671 A | * | 11/1979 | Holl et al. ................... | 220/235 |
| 4,369,813 A | * | 1/1983 | Thomas ........................ | 138/89 |
| 4,425,943 A | | 1/1984 | Martin | |
| 4,474,216 A | * | 10/1984 | Noe .............................. | 138/89 |
| 4,625,765 A | * | 12/1986 | O'Donnell et al. ........... | 138/89 |
| 5,099,868 A | * | 3/1992 | Weber .......................... | 138/89 |
| 5,181,543 A | * | 1/1993 | Hendzel ...................... | 138/90 |
| 5,429,394 A | * | 7/1995 | Olson .......................... | 138/89 |

FOREIGN PATENT DOCUMENTS

GB 1 384 076 2/1975

* cited by examiner

Primary Examiner—James Hook
(74) Attorney, Agent, or Firm—Larson & Taylor PLC (57) ABSTRACT

A pipe end fitting (13) has a cup-shaped body (15) for fitting on the end of a pipe (14), and gripping (20, 22) and sealing (18) assemblies that fit radially inside the pipe and the cup-shaped body and are radially expandable to engage the pipe interior. The gripping assembly Includes a toothed expandable assembly (20) and an expansion mandrel (22) that is urgeable axially into the cup to expand the expandable assembly. This also axially compresses the sealing assembly (18), which is formed of at least two annular bodies (30, 34) and two sealing rings (42, 56). At least one body has a ramp surface (74, 76) that urges radial expansion of a sealing ring (42, 54) to seal to the pipe.

9 Claims, 8 Drawing Sheets

PIPE END FITTINGS

BACKGROUND OF THE INVENTION

The present invention relates to end fittings for connection to pipes (or other at least partly tubular objects), especially polyethylene and other plastic pipes. It particularly relates to towing heads and pressure test sets.

Towing heads may be useful in pipe laying and in directional drilling. For example, a hole for a pipe may be produced, e.g. under a road, by means of a drill string. This is then connected to a reamer and pipe and drawn back.

High pressure mud is pumped down the drill string and through the reamer during the drilling and reaming operations.

The reamer enlarges the hole to accommodate the pipe. However in the process the pipe is subject to considerable stresses. It risks being damaged or detached. Even if neither of these happens, mud may be forced into its interior, necessitating cleaning before use, especially if it is for use as a water supply pipe, gas pipe, or fibre optic duct.

Each polyethylene pipe of a particular outside diameter may be manufactured with a range of wall thicknesses, depending on the application, resulting in a range of internal diameters. Generally, the outside diameter of the pipe is carefully controlled in the manufacturing process, and a manufacturing tolerance applied to the wall thickness, resulting, again in a variation of internal diameter. It would therefore appear to be simpler technically to design a towing head to seal on the outside, tightly controlled diameter of the pipe than the inside, variable diameter. There are, however difficulties associated with sealing on the outside which become apparent when the four varieties of "expanding" towing head are considered.

A standard, (non pressure-tight) towing head employs a threaded shaft with a towing eye at one end. The shaft passes through an expandable element, and engages a tapered expansion mandrel. In use, a pine is passed onto the head so as to surround the expandable element. Rotation of the shaft draws the mandrel further into the expandable element, causing it to expand radially and grip the bore of the pipe. The pipe-engaging surface of the expandable element has annular ribs of sawtooth section for gripping the pipe. Thus a strong connection can be attained quite easily. This is generally sufficient for a normal pipe laying process. But when very high forces are involved, e.g. in a directional drilling process, it may not suffice. The mandrel can be drawn up further to apply greater force to the pipe, but this increases the risk of splitting the pipe as the pipe continues to expand until the shoulder on the tail of the device impinges the rear of the expanding elements.

A known pressure-tight towing head, which was designed originally to facilitate pressure testing of installed pipe in addition to its use as a towing device, differs from the standard towing head in having a modified tail which is drawn into a separate expander by rotating the eyebolt. The relative axial motion of the tail and expander causes an 'O' ring to expand radially outwards and seal on the pipe. However, there are two problems associated with this style of towing head. Firstly, the limited movement of the sealing 'O' ring precludes the use of the same device on more than one wall thickness of pipe. Secondly, as the expanding elements engage the plastic pipe it expands outwards tending to lift off the 'O' ring and causing the seal to be lost.

A known directional drilling towing head has an annular skirt surrounding and spaced from the expandable element. Generally, the diameter of the expandable element in a non-expanded state will be less than the internal diameter of the skirt (at least at a rear portions and at least in part less than the internal diameter of a pipe to be engaged. Thus a pipe can be engaged over at least part of the expandable element whose subsequent expansion causes the pipe to be engaged between the element and the skirt.

Preferably the skirt has sealing means on its radially inner surface for sealing to a pipe. Since the external diameters of pipes are normally accurately controlled in manufacture, this leads to reliable sealing. A single end fitting is suitable for use with a range of pipes with different internal diameters.

Generally the expandable element has radial projections such as circumferentially extending ribs (e.g. complete or partial annular ribs) that engage the pipe as it expands. Since the rearward ribs tend to be forced more strongly against a pipe than the forward ones, a rearward rib may be shaped and/or dimensioned so as to be less inclined to cut into a pipe.

The end fitting may be a towing head, in which case the elongate element may be a threaded bolt, typically having an engagement formation such as an eye at its front end. A towing head's body normally has a tapered front portion. There may be separate front and skirt portions. They may be connected by a screw-threaded connection. Of course the handedness of the thread should be such that the parts do not tend to become unscrewed in use.

There are two problems associated with this style of towing head. Firstly, of necessity, the internal diameter of the sealing 'O' rings positioned in thee outer sleeve is less than the outside diameter of the polyethylene pipe. Thus it is difficult to engage the sleeve over the end of the pipe, especially if the pipe has been coiled and its end is oval. Secondly, if the skirt is of sufficient wall thickness to accommodate the sealing rings, this adds significantly to the effective diameter of the pipe. In some circumstances, this may necessitate an increase in the size of the drilled and reamed hole. Furthermore, the square shoulder generally present on the rear of the skirt may foul obstacles if the pipe has to be pulled back out.

A second variety of directional drilling towing head which facilitates the engagement of the outer sleeve over the end of the pipe has an outer skirt made up of a body and a threadedly engaged operating ring. A 'O' ring, the internal diameter of which is, at rest, larger than the outside diameter of the pipe, is compressed onto the pipe by rotating the operating ring relative to the body, However, the radial thickness of the operating ring is even more significant than the wall thickness of the fixed 'O' ring variety and can create great problems if extraction of the pipe becomes necessary.

Increasingly, utility companies co-operate in the installation of ducts and pipes such that large numbers, often of different sizes and for different purposes, are ganged up and, in one operation, are pulled into a single reamed hole. Under these circumstances, outside sleeves reduce the number of ducts which can be ganged, which is another reason why the outside diameter of the sleeve should be kept to a minimum. "Ganging up" is achieved using a "multi duct puller", together with any variety of towing head. Increasingly, the ingress of bentonite (drilling mud) and debris is becoming a serious problem in both gas and fibre optics as well as in water pipe installations.

The design of equipment to pull in ducts, either singly or in multiples must address at least some of the following:

1) Outside diameter of outside sleeve to be kept small.
2) The insertion and locking of the pipe into the device must be simple to achieve and without stress or danger to the operative.

3) Maximum number of ducts or pipes (from 1 upwards) must be accommodated in the minimum cross sectional area.

4) Must be resistant to the ingress of bentonite and debris.

5) Must accommodate a range of specified wall thicknesses and manufacturing tolerances.

Preferred embodiments of the device described hereafter satisfy all or some of these five criteria.

SUMMARY OF THE INVENTION

According to the present invention, there is provided an end fitting or a tubular element (particularly a pipe) comprising;

a cup-form body having a base portion and a skirt portion, the base portion having an axial aperture;

an annular sealing assembly which, in use, is within said skirt portion adjacent said base portion;

radially expandable pipe gripping means which are, in use, at least partly within said skirt portion;

expansion means axially displaceable towards the base portion to urge expansion of said pipe gripping means; and an elongate element extending through said axial aperture, sealing assembly and the pipe fitting means and being coupled to said expansion means;

wherein said annular sealing assembly comprises: a first annular body; a first sealing ring surrounding said first annular body; a second annular body which is axially displaceable relative to said first annular body; the arrangement being such that relative axial displacement in one sense urges radial expansion of said first sealing ring; and a second sealing ring for sealing the sealing assembly to the body.

Preferably the first annular body has a first cylinder portion on which the first sealing ring is mounted, and an enlarged end portion; and the second annular body comprises a collar portion which embraces the cylinder portion; and said collar portion and said enlarged end portion are arranged to engage the first sealing ring and at least one of them is formed with an expander surface such that relative axial movement urges expansion of the first sealing ring.

In one type of embodiment there is also a third annular body which is axially displaceable relative to the second annular body to urge radial expansion of the second sealing ring. The second or third annular body may provide a second cylinder portion on which the second sealing ring is mounted, and an enlarged end portion, said second or third cylinder portion being embraced by a collar portion of the other one of the said second and third annular bodies, the collar portion and enlarged end being arranged to engage and expand the second sealing ring. Preferably the first and second cylinder portions are of different diameters and the sealing assembly is reversible. Thus either sealing ring can seal to a pipe while the other one seals to a respective interior annular surface provided by the skirt portion of the body.

The elongate element may be a screw bolt, particularly when the end fitting is a pipe towing head. It may then be coupled to a threaded bore of the expansion means so that rotation of the bolt draws the expansion means towards the base portion of the body, thus urging expansion of the pipe gripping means and urging axial displacement of the annular bodies of the sealing assembly to urge radial expansion of the first (and in some embodiments the second) sealing ring.

The elongate element may be a tubular element, e.g. if the end fitting is a pressure test end. The elongate element may be fast with the expansion means.

A multiple connection unit may provide end fittings for two or more tubular elements.

In further aspects the invention provides a method of connecting an end fitting to a tubular element, and a process of pipe laying or directional drilling employing an end fitting as defined above. By sealing on the inside of the pipe (only) the outside diameter of the sleeve may be kept to a minimum. The annular sealing assembly or sealing cartridge accommodates a range of wall thicknesses, particularly when reversible. The expanding 'O' ring principle ensures ease of installation. A multiple connection circuit may employ a geometric layout of the docking ports to ensure that the maximum number of ducts can be accommodated in the minimum area.

Generally, the diameter of both the expandable pipe gripping means in a non-expanded state and the annular sealing assembly will be less than the internal diameter of the skirt (at least at a rear portion) and at least in part less than the internal diameter of a pipe to be engaged. Thus a pipe can be engaged over at least part of the expandable pipe gripping means whose subsequent expansion causes the pipe to be engaged between the gripping means and the skirt, and over the sealing assembly whose subsequent compression causes expansion of the first sealing ring, which seals the pipe.

Generally the expandable pipe gripping means has radial projections such as circumferentially extending ribs (e.g. complete or partial annular ribs) that engage the pipe as it expands. Since the rearward ribs tend to be forced more strongly against a pipe than the forward ones, a rearward rib may be shaped and/or dimensioned so as to be less inclined to cut into a pipe. The pipe gripping means generally comprise a plurality of part-cylindrical shells.

The end fitting may be a towing head, in which case the elongate element may be threaded bolt, typically having an engagement formation such as an eye at its front end. A towing head's body normally has a tapered front portion. There may be a separate front and skirt portions. They may be connected by a screw-threaded connection. Of course the handedness of the thread should be such that the parts do not tend to become unscrewed in use.

If more than one duct is to be installed at the same time, then a body having multiple docking ports may be used. Each docking port may contain an elongate element, an expandable pipe gripping means, an annular sealing assembly and an expansion means as in the single duct variety. Each is operated in exactly the same way as for a single duct puller. A mud tight nose is then assembled to the front of the body and is secured by the eyebolt which is also used to apply the pulling force to the device.

The invention will now be described in more detail, by way of example, with reference to the accompanying drawings.

DESCRIPTION OF THE PREFERRED EMBODIMENTS

Figure 1:
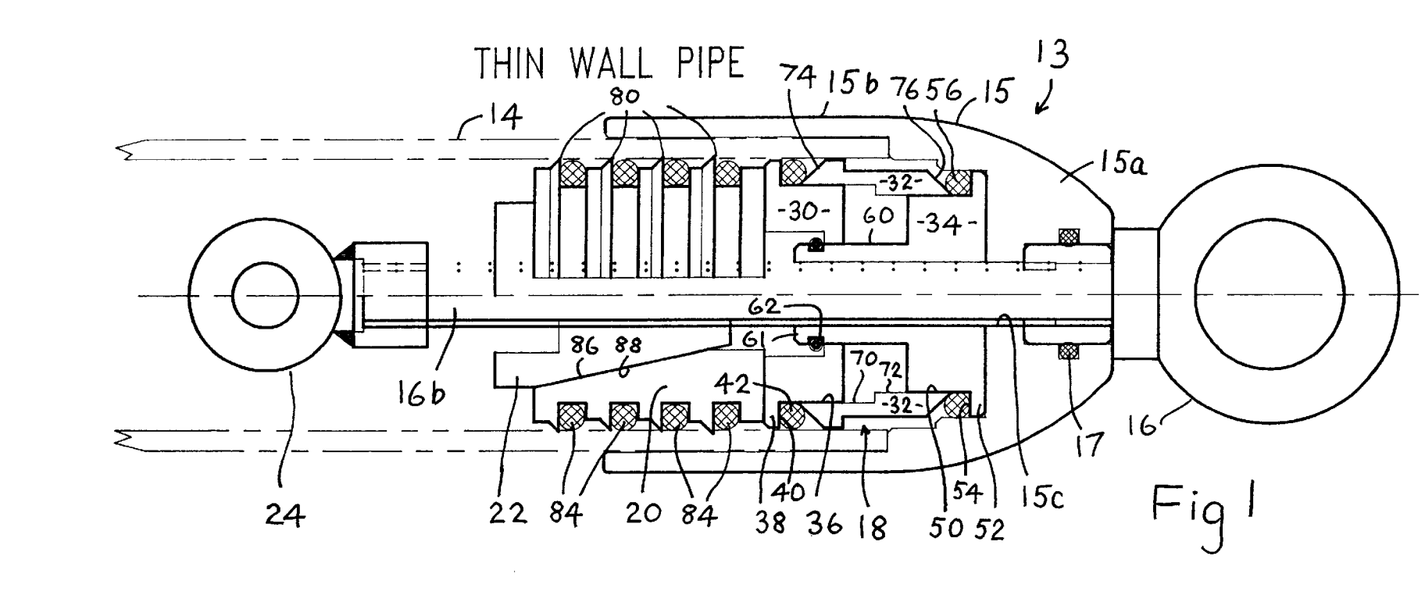
FIG. 1 is an axial section of a pipe towing head which is a first embodiment of the invention, engaging a pipe having a thin wall.

FIG. 1 shows a pipe towing head 13 engaging a thin walled pipe 14. The towing head has a cup form body 15 having a base portion 15a and a skirt portion 15b.

The base portion 15a has an axial aperture 15c through which a collared eyebolt 16 extends, sealed by an 'O' ring 17. The eyebolt 16 has a towing eye 16a at its front end. Its threaded shaft 16b projects rearwardly behind the skirt portion 15b. It passes successively through an annular sealing cartridge 18, a radially expandable pipe gripping element 20; and a threaded bore in an expander 22, and its rear end engages a threaded bore in a rear eye nut 24.

The sealing cartridge 18 includes three annular bodies 30, 32, 34. The first body 30 (which is at the rear in FIG. 1) has a cylindrical outer surface portion 36 and an enlarged head 38, at the rear end in FIG. 1. This provides an upstanding surface 40 against which a sealing ring 42, mounted on the cylindrical surface 36, abuts. The third annular body 34 is similar in that it too provides a cylindrical outer surface 50 and an enlarged head 52 which provides an upstanding surface 54 against which a further sealing ring 56 abuts. The third body is oriented oppositely from the first body so that, in the configuration shown in FIG. 1, its enlarged head is at the front side. Its cylindrical surface 50 is of smaller diameter than the cylindrical surface 36 of the first body. Thus a sealing ring 56 of similar thickness to the sealing ring 42 on the first body is adapted to seal against an outer surface of smaller diameter.

The third body 34 also has an axial protrusion 60 which projects slideably through an aperture in the first body 30. An end portion 61 extends into an enlarged cavity 31. It has an annular groove on which an O-ring 62 is mounted to retain the three bodies 30, 32, 34 together.

The second annular body 32 has an internal surface which is stepped so as to provide first and second inner surface portions 70, 72 adapted to overlap slidingly the cylindrical surfaces 36, 50 of the first and third bodies, respectively. At each axial end, the second body 32 provides an angled expander surface 74, 76 for engaging a respective sealing ring 42, 56.

Figure 6A:
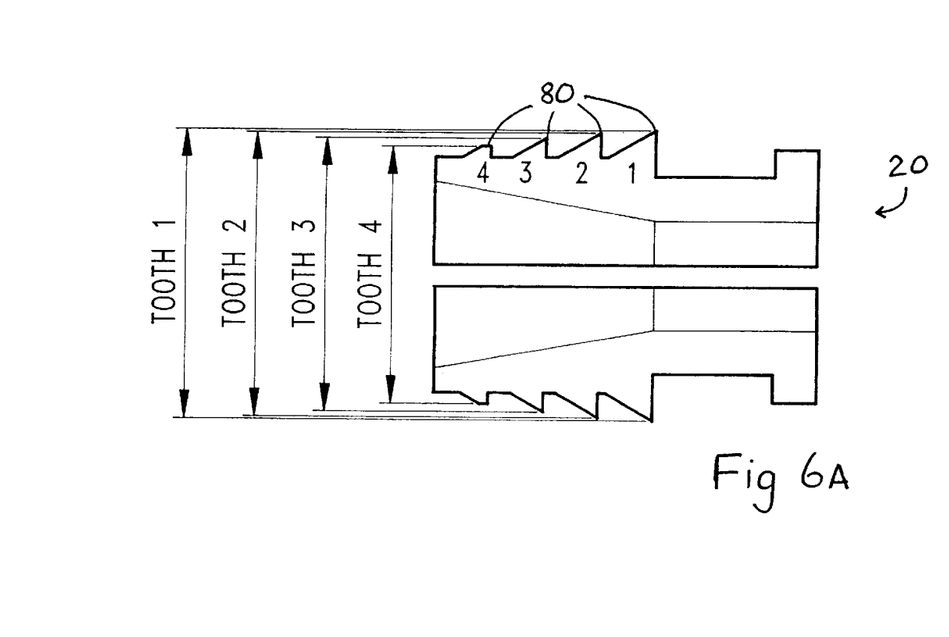
FIGS. 6A and B are an axial section and an axial end view of an expandable gripping element.
Figure 6B:
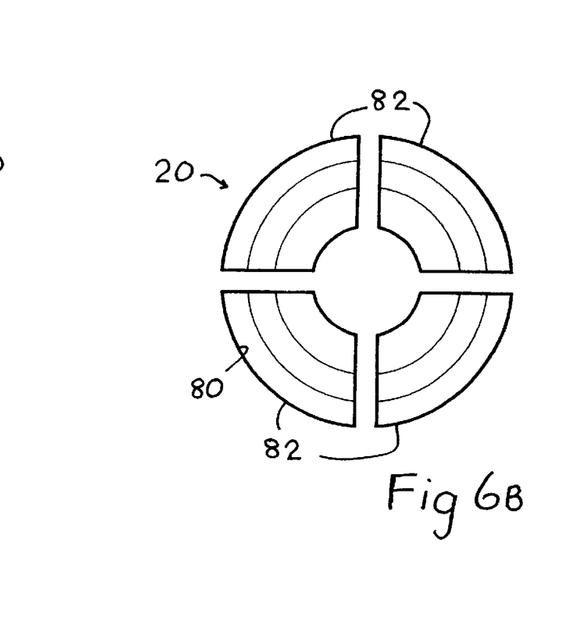

The radially expandable pipe gripping element 20 is a generally cylindrical assemblage, with circumferential sawtooth projections 80 whose height may decrease rearwardly (see FIG. 6a). It is formed from a plurality (in this example, four) sectoral metal shells 82, retained together by a O-rings 84 located in the annular channels between the sawteeth 80.

The expander 22 has a forwardly-facing frustoconical expansion surface 86, and the pipe gripping assemblage 20 has a matching internal surface 88.

When the eye bolt 16 is rotated in the correct sense, the expander 22 is drawn into the pipe gripping assembly 20, urging the shells 82 radially outwardly. It also urges the shells 82 forwardly, applying axial compression to the sealing cartridge 18. The enlarged heads 38, 52 of the first and third annular bodies 30, 34 tend to move together so that the sealing rings 42, 56 are squeezed between the upstanding surfaces 40, 54 and the expander surfaces 74, 76 of the second annular body 32. The rings 42, 56 are thus urged to expand outwardly. In the case of the rearward ring 42, this urges it against the inner face of the pipe 14. In the case of the front ring 56, this urges it against a sealing face 90 provided in a stepped region of the skirt.

The rear eye nut 24 prevents the expander 22 becoming detached from the eyebolt 16 when the eyebolt is "undone".

Figure 2:
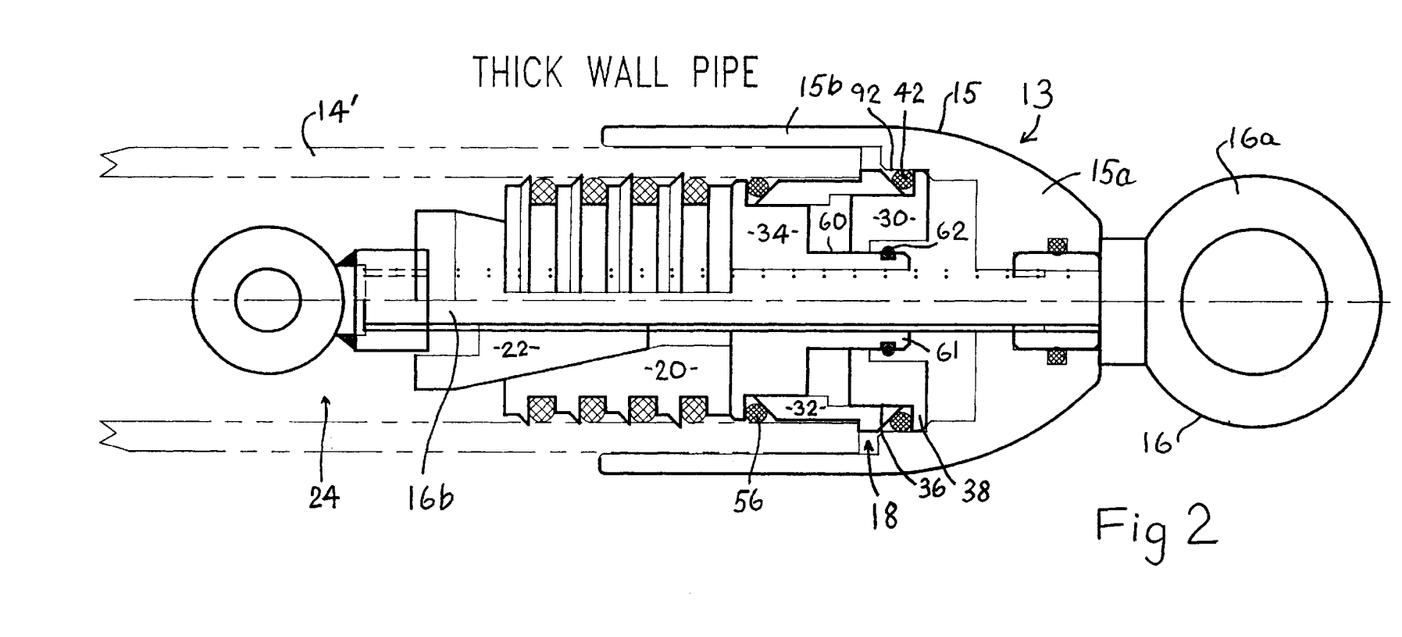
FIG. 2 is an axial section of the first embodiment in a different configuration, engaging a pipe having a thicker wall.

To engage the device on a thick walled pipe 14' as in FIG. 2 the sealing cartridge 18 is first reversed on the eyebolt 16 after removing the rear eye nut 24, the expander 22, and the expandable element 20. The fact that the three bodies 30, 32, 34 are retained together by the O-ring 62 simplifies this. After reversing the cartridge, the other components are replaced. In this configuration, when the eyebolt is rotated, the sealing cartridge seals with the smaller sealing ring 56 on the pipe. The larger sealing ring 42 seals on a larger sealing surface 92 on the skirt.

Thus a single embodiment of this device may attach to and seal a range of pipes having the same outside diameter but several internal diameters.

In the further embodiments, elements corresponding to elements in the first embodiment are given the same reference numerals.

Figure 3:
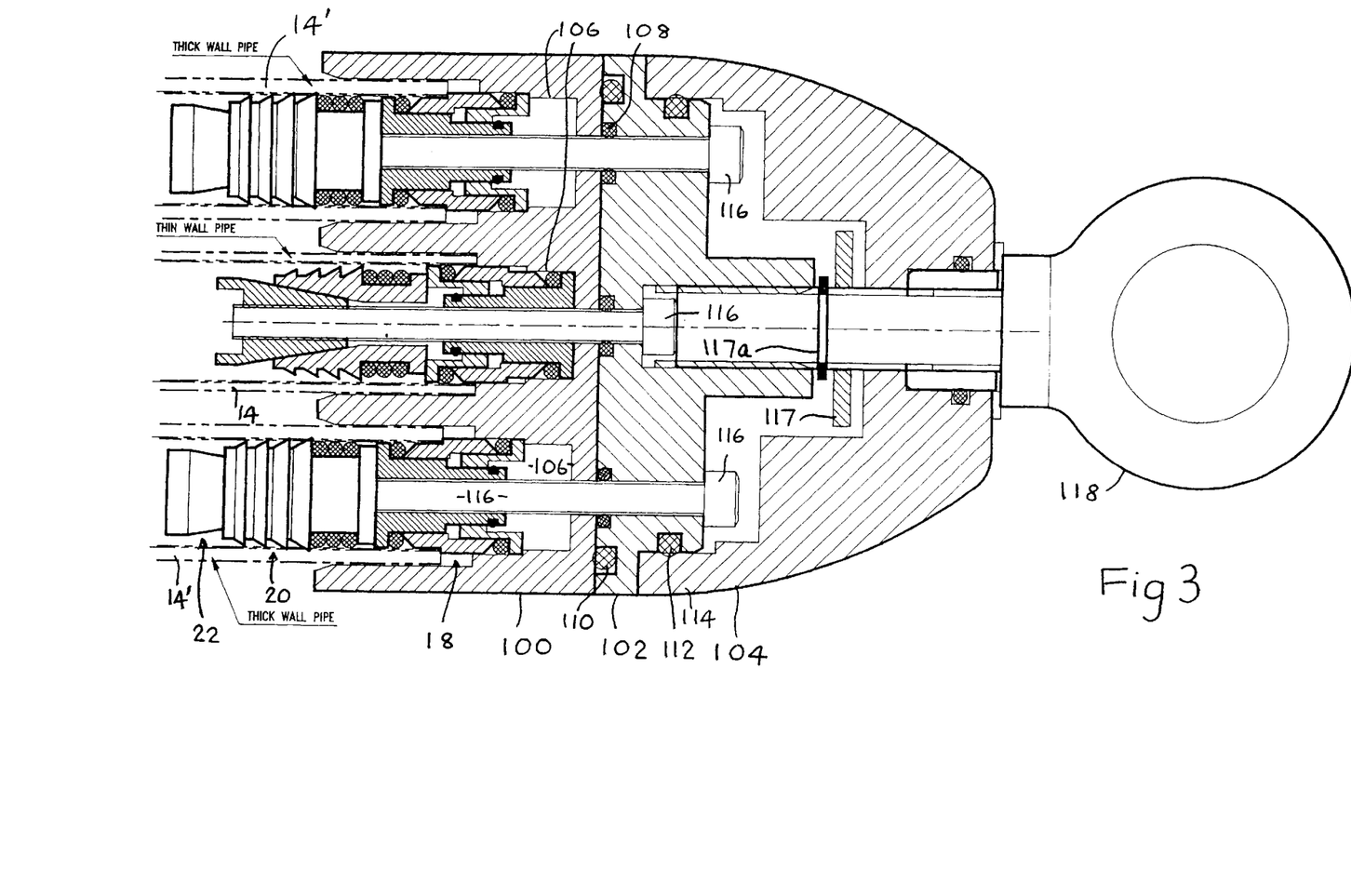
FIG. 3 is a view similar to FIG. 1 but showing a second embodiment engaging several pipes simultaneously.
Figure 4:
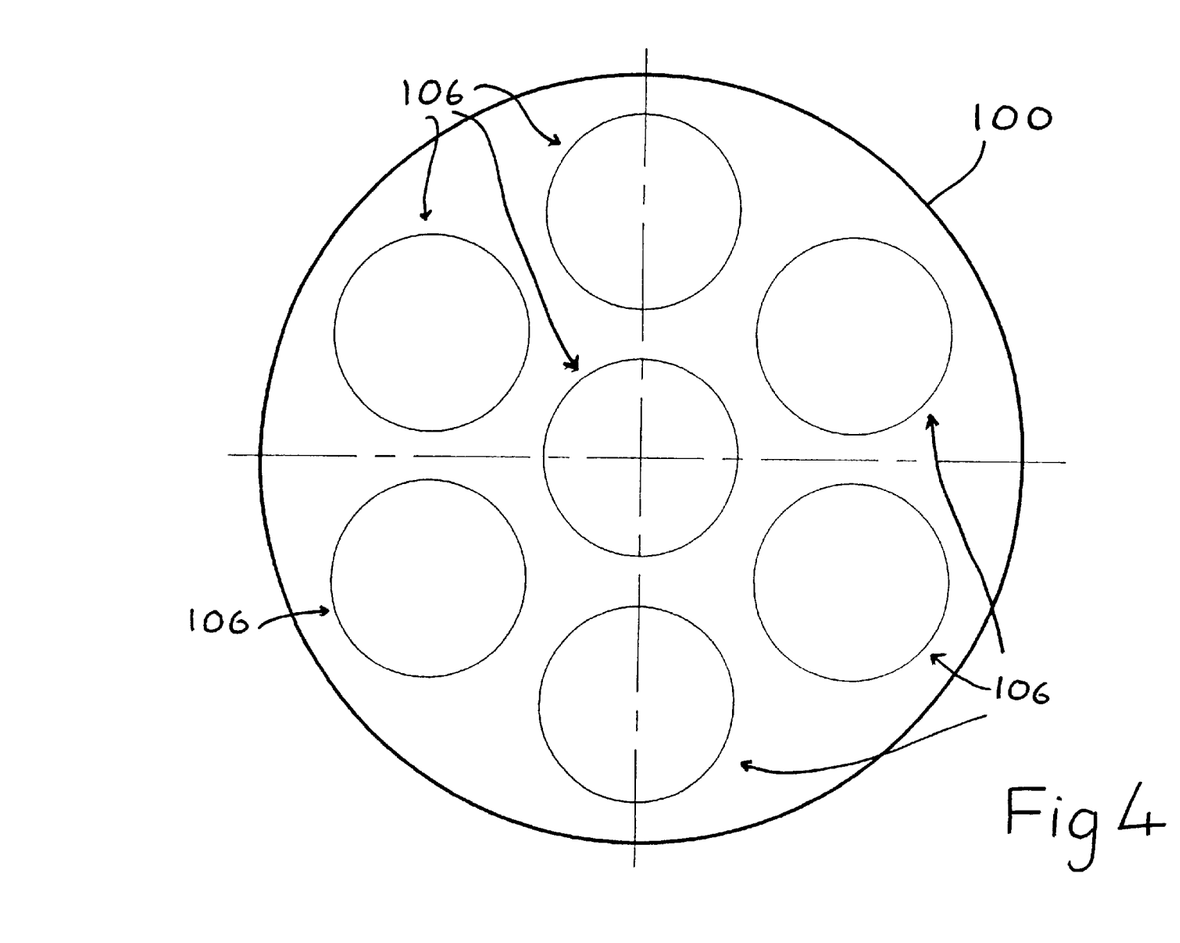
FIG. 4 is an axial end view of the second embodiment.

FIGS. 3 and 4 show a tow head assembly for use with a multiplicity of pipes (up to 7 in this embodiment). A large tow head has a body formed from three components 100, 102, 104. The rear component 100 has a multiplicity of cavity—defining regions 106 substantially corresponding to the cup-form body 15 of the first embodiment. Thus a respective cap head screw 116 (corresponding to the eyebolt 16) extends into each of these, and engages a sealing cartridge 18, a gripping element 20 and an expander 22. Three such assemblies are visible in FIG. 3. The central one is configured as in FIG. 1 and engages a thin-walled pipe 14 while the other two are configured as in FIG. 2 and engage a thick-walled pipe 14'.

The second component 102 is sealingly connected to the first component 100. It has apertures for the cap head screws 116, with sealing rings 108 for sealingly engaging them and a large sealing ring 110 for engaging the end face of the first component 100. In this embodiment, the screws 116 do not have towing eyes 16a, since there is a single large towing eye 118 which passes through an aperture in the third component 104, a washer 117 and a circlip 117a, and is screwed into the second component 102. The third component 104 is detachable, after the eye bolt 118 is unscrewed from the second component 102. This allows access to the various cap head screws 116 so that they can be rotated for effecting expansion of the associated pipe gripping elements 20 etc. The third component is sealed to the second component 102 by a sealing ring 112 mounted in an annular channel in a cylindrical region of the second component 102 which is embraced by a skirt region 114 of the third component.

Figure 5:
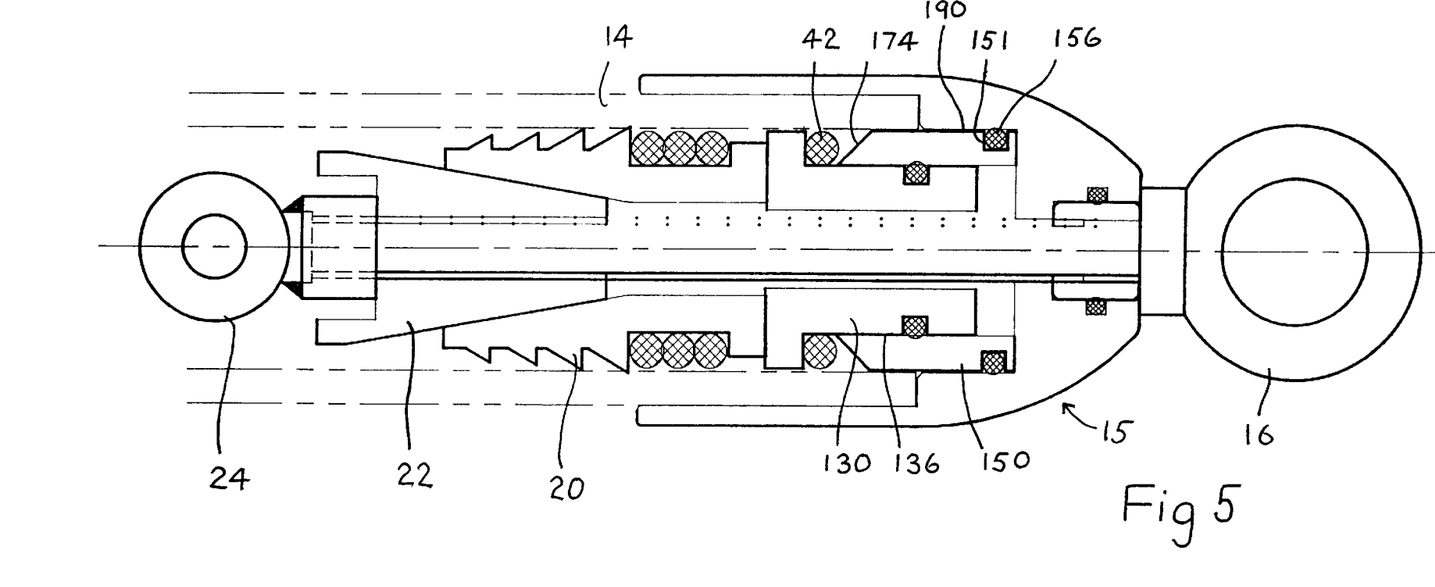
FIG. 5 is an axial section of a third embodiment of the invention having a single configuration engaging a pipe.

FIG. 5 shows a pipe towing head rather similar to that of FIG. 1. However in this case the annular sealing assembly is not reversible. The first annular body 130 has an extended cylindrical surface portion 136, which is slidingly embraced by a cylindrical portion of a further annular body 150 which takes the place of the second and third annular bodies 32, 34 of the first embodiment. Thus it provides an expander surface 174 for expanding a sealing ring 42 against the inner surface of a pipe 14. It also has an annular channel 151 housing a sealing ring 156 which seals against a (non-stepped) surface 190 of the skirt.

Figure 7:
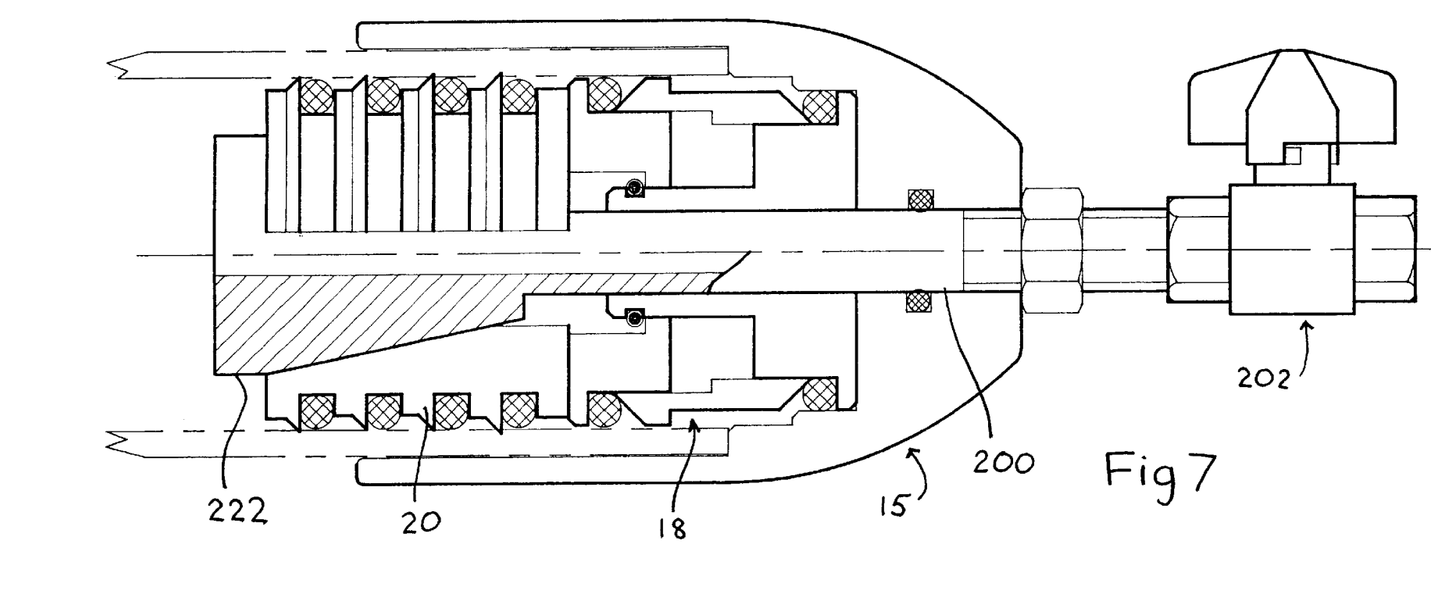
FIG. 7 is an axial section of a fourth embodiment which is a pressure test end. This device is used as a means of applying pressure to a pipe in order to test its integrity.

FIG. 7 shows an embodiment generally similar to the first embodiment but in the form of a pressure test kit. Thus in place of an eye bolt 16, there is a tube 200 bearing a tap assembly 202 at the front. In the example, the pipe 200 is fast with the expander 222.

Figure 8:
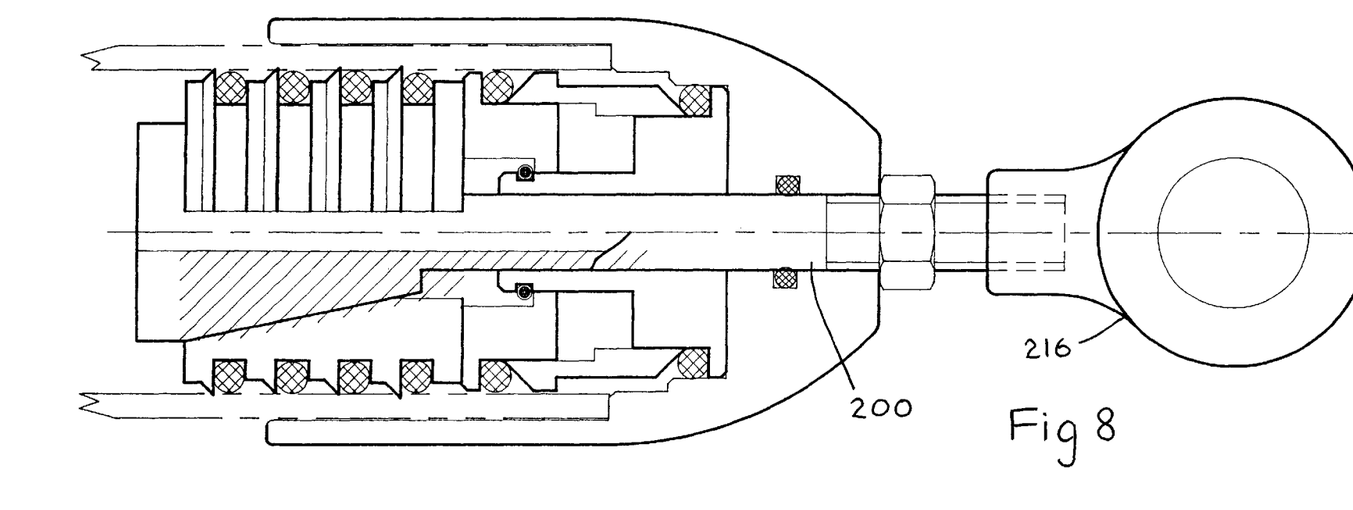
FIG. 8 is an axial section showing the fourth embodiment converted into a towing head.

FIG. 8 shows the embodiment of FIG. 7 converted into a towing head, by replacement of the tap assembly or valve 202 with an eye nut 216.

Whereas the invention has been illustrated with reference to some preferred embodiments it will be understood by those skilled in the art that various changes and modifications can be made without departing from the spirit and scope of the invention and it is intended to cover all such changes and modifications by the appended claims.

I claim:

1. An end fitting for a tubular element comprising:
   a cup-form body having a base portion and a skirt portion, the base portion having an axial aperture;
   an annular sealing assembly which, in use, is within said skirt portion adjacent said base portion;
   a radially expandable pipe gripping array which is, in use, at; least partly within said skirt portion;
   an expander axially displaceable towards the base portion to urge expansion of said pipe gripping array; and
   an elongate element extending through said axial aperture, sealing assembly and the pipe griping array and being coupled to said expander;
   wherein said annular sealing assembly comprises: a first annular body; a first sealing ring surrounding said first annular body; a second annular body which is axially displaceable relative to said first annular body; the arrangement being such that relative axial displacement in one sense urges radial expansion of said first sealing ring; and a second sealing ring for sealing the sealing assembly to the body.

2. An end fitting according to claim 1 wherein the first annular body has a first cylinder portion on which the first sealing ring is mounted, and an enlarged end portion; and the second annular body comprises a collar portion which embraces the cylinder portion; and said collar portion and said enlarged end portion are arranged to engage the first sealing ring and at least one of them is formed with an expander surface such that relative axial movement urges expansion of the first sealing ring.

3. An end fitting according to claim 1 also including a third annular body which is axially displaceable relative to the second annular body to urge radial expansion of the second sealing ring.

4. An end fitting according to claim 3 wherein one of said second and third annular bodies provides a second cylinder portion on which the second sealing ring is mounted, and an enlarged end portion, said second or third cylinder portion being embraced by a collar portion of the other one of the said second and third annular bodies, the collar portion and enlarged end being arranged to engage and expand the second sealing ring.

5. An end fitting according to claim 1 wherein the first and second cylinder portions are of different diameters and the sealing assembly is reversible, whereby either sealing ring can seal to a pipe while the other one seals to a respective interior annular surface provided by the skirt portion of the body.

6. An end fitting according to claim 1 wherein the elongate element is a screw bolt, and the expander has a threaded bore in which it is engageable so that rotation of the bolt draws the expansion means towards the base portion of the body, thus urging expansion of the pipe gripping array and urging axial-displacement of the annular bodies of the sealing assembly to urge radial expansion of at least the first sealing ring.

7. An end fitting according to claim 1 in which the elongate element is a tubular element and is fast with the expander.

8. A multiple connection unit comprising respective end fittings according to claim 1 for two or more tubular elements.

9. A method of connecting an end fitting to a tubular element comprising providing an end fitting according to claim 1 and connecting it to the tubular element.

* * * * *